United States Patent Office 3,637,677
Patented Jan. 25, 1972

3,637,677
NITROSOAMINES
Carl T. Bahner, David H. Brotherton, and Mary K. Brotherton, Jefferson City, Tenn., assignors to the United States of America as represented by the Secretary of the Department of Health, Education, and Welfare
No Drawing. Filed Feb. 14, 1969, Ser. No. 799,505
Int. Cl. C07c 87/28; C07d 33/52
U.S. Cl. 260—240.9    6 Claims

ABSTRACT OF THE DISCLOSURE

A series of nitrosoamines which comprise 4-N-nitroso-N-alkylaminobenzylidene derivatives of a fused bicyclic moiety selected from 1-indene, 2-methyl quinoline, 4-methyl quinoline, and 1-methyl isoquinoline.

In contrast to the carcinogenic activity exemplified by related nitroso and amino compounds, members of the present group of nitroso compounds have exhibited carcinostatic activity in animals in standard tests against Walker 256 tumor.

---

The present invention is directed towards a group of N-nitrosoamines which are characterized by a lower alkyl substituent coupled with an aromatic substituent fulfilling a particular structural configuration. Formulas showing the structural configuration for this group of compounds are set out below:

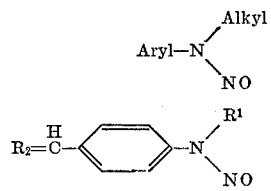

The N-alkyl fraction is lower alkyl, and within that grouping is limited to a $C_1$–$C_4$ variety. Preferred species are methyl and ethyl, and the carcinostatic activity varies inversely with the molecular weight of the substituent and dies out above $C_4$.

The N-aromatic fraction is characterized by an ethylenic linkage para to the amino monoaryl and such may be achieved by utilizing the aminostyryl or benzylidene configuration. Additionally, attached to the ethylene linkage remote from the monoaryl, there is attached a fused bicyclic moiety selected from 1-indene, 2-methyl quinoline, 4-methyl quinoline, and 1-methyl isoquinoline. These compounds may be also alternatively viewed as 4-N-nitroso-N-alkylaminobenzylidene derivatives of a fused bicyclic moiety selected from 1-indene, 2-methyl quinoline, 4-methyl quinoline, and 1-methyl isoquinoline.

N-ARYL FRACTION VARIATION OF ACTIVITY WITH STRUCTURE

A preferred structure as to $R^2$ is 4-methyl quinoline or 1-indene, and most preferred compounds are 1-(4-N-methyl-N-nitrosoaminobenzylidene)indene and 4-(4-N-methyl-N-nitrosoaminostyryl)quinoline.

In Table I below the key column T/C means the weight of tumor in test animal versus weight of tumor in control animal and indicates the efficacy of the compounds in the testing. To be effective, a value of below .50 is arbi-

TABLE I
[Activity against Walker 256 Tumor using laboratory animals (Compounds 3,5,6 for comparison)]

| No. | Compound | Yield percent [a] | M.P., °C.[b] | Formula[c] | KB cell test, $ED_{50}$,[d] g./ml. | Tumor wt. mg./kg. | T/C | Lethality mg./kg. | Killed |
|---|---|---|---|---|---|---|---|---|---|
| 1 | 1-(4-N-ethyl-N-nitroso-aminobenzyl-idene)indene. | 53 | 123–124 | $C_{18}H_{16}N_2O$ | | •4×100 | 0.56 | •4×400 | 0/13 |
| | | | | | | [f]500 | 0.14 | | |
| | | | | | | [f]1,250 | 0.08 | [f]1,250 | 0/3 |
| 2 | (4-N-ethyl-N-nitrosoaminostyryl)quinoline. | 59 | 120.5–122.0 | $C_{19}H_{17}N_3O$ | | •4×100 | 0.10 | •4×400 | 1/6 |
| | | | | | | •4×200 | 0.02 | | |
| 3 | 9-(4-N-Methyl-N-nitrosoaminobenzyl-idene)fluorene- | 73 | 145–146 | $C_{21}H_{16}N_2O$ | 100 | •4×400 | 0.90 | •4×400 | 0/6 |
| | | | | | | [f]1,500 | 1 | [f]1,500 | 0/3 |
| | | | | | | [f]50 | 0.15 | [f]1,500 | 0/3 |
| 4 | 1-(4-N-methyl-N-nitrosoaminobenzyl-idene)indene. | 57 | 144–146 | $C_{17}H_{14}N_2O$ | 35 | [f]240 | 0.16 | | |
| | | | | | | [f]600 | 0.07 | | |
| | | | | | | •4×400 | 0.61 | •4×400 | 0/6 |
| 5 | 2-N-methyl-N-nitrosoaminofluorene | 51 | 120.5–122.0 | $C_{14}H_{12}N_2O$ | | •4×600 | 0.8 | •4×600 | 0/6 |
| 6 | 4-N-methyl-N-nitrosoaminostilbene | 33 | 157 | $C_{15}H_{14}N_2O$ | | •4×400 | 0.6 | •4×400 | 0/6 |
| 7 | 4-(4-N-methyl-N-nitrosoaminostyryl)quinoline. | 84 | 157–158 | $C_{18}H_{15}N_3O$ | 66 | [f]30 | 0.3 | [f]25 | 1/2 |
| | | | | | | [f]75 | 0.15 | [f]75 | 0/3 |
| | | | | | | •4×100 | 0.45 | •4×1,000 | 0/6 |
| | | | | | | •4×1,000 | 0.09 | | |

[a] Additional material could be recovered from the mother liquors.
[b] Corrected for thermometer stem exposure; determine with Thiele tube.
[c] All compounds were analyzed for C, H. Analytical results obtained for those elements were within ±0.3% of the theoretical values.
[d] Results of the standard "in vitro" KB tumor cell inhibition tests carried out under sponsorship of the Cancer Chemotherapy National Service Center at Southern Research Institute and A. D. Little Co.
[e] C.C.N.S.C. made screening tests against Walker 256, using four daily injections beginning 3 days after tumor implant, carried out at Battelle Memorial Institute.
[f] Chester Beatty Research Institute achieved data on toxicity and activity against the Walker 256 tumor in rats weighing 200–250 g.

NOTE.—Each compound was administered as a single intraperitoneal injection in arachis oil on the day following tumor implantation or in the first day of the toxicity observation. Tumor bearing animals were sacrificed approximately 8 days later and the average weights of tumors in treated and untreated hosts are reported as the ratio T/C.

--- trarily given. It is noted that compounds 4 and 7 apparently gave superior results, and where the configuration of the molecule was changed, as in comparative compound 6 with stilbene and also in compounds 3 and 5 with fluorene, ineffective test data was achieved. The carcinostatic activity of these compounds, selected members of which are shown above, is surprising in view of the previous carcinogenic activity of nitrosoamines generally. (Cf. H. Druckrey, R. Preussmann, S. Ivanocic, and D. Schmahl, Z. Krebsforsch., 69, 103 (1967).)

GENERALIZED PROCESS FOR PREPARATION OF THE COMPOUNDS

A stoichiometric amount of sodium nitrite was added to an acid alcoholic solution of the predetermined monoalkyl amine at a temperature 0–5°. Water was added to dissolve the sodium nitrite salt and the mixture was agitated and the product was crystallized. The yellow crystalline material obtained was recrystallized from oxygenated solvents; e.g., ethanol and isopropyl ether. Selected specific examples are given post.

AMINE REACTANTS

The amine starting materials for preparing the compounds of the present invention are known and are described in one or more of the following publications by C. T. Bahner: Carl T. Bahner, J. Med. Chem. 8, 390, 1965, 1-(4-alkylaminobenzylidene)indene; J. Med. Chem. 7, 818, 1964, 4-(4-alkylaminostyryl)quinoline; J. Org. Chem. 27, 2233, 1962; and J. Org. Chem. 22, 683, 1957.

Additionally, it has been noted that 1-(4-N-methyl-N-nitrosoaminobenzyl)indane prepared by hydrogenation of 1-(4-N-nitrosoaminobenzylidene)indene and elimination of the ethylene structure from the molecule was ineffective against the Walker 256 tumor at 600 mg./kg. and only slightly effective at 1500 mg./kg. with a T/C=0.60.

UTILITY STATEMENT

The compounds of this invention have present utility in carcinostatic activity against Walker 256 tumor as shown by standard tests in animals.

EXAMPLES

The following examples illustrate the working of this invention:

Example I 1-(4-N-methyl-N-nitrosoaminobenzylidene)indene

A magnetic stirrer was employed to dissolve 4.6 g. (.02 m.) of 1-(4-methylaminobenzylidene)indene in 200 ml. of absolute ethanol. After this solution was cooled to 0–5° C. in an ice bath, 5 ml. (11.7 molar) HCl and then 1.4 g. of sodium nitrite and 5 ml. of water were added rapidly. The mixture turned from a dark orange to a lemon color after the addition of the HCl and sodium nitrite solution. The mixture was stirred during the cooling period above during the addition of HCl and sodium nitrite and also for an additional 2 hours. The solid was removed by filtration and recrystallized from ethanol and isopropyl ether. The purified compound exhibited a melting point 144–46° C. and appeared as yellow plates.

Example II 4-(4-N-methyl-N-nitrosostyryl)quinoline

In 100 ml. absolute ethanol 10.4 g. (.04 m.) 4-(4-methylaminostyryl)quinoline were dissolved using a magnetic stirrer. This solution was cooled to 0–5° C. Immediately 10 ml. (11.7 molar) HCl were added and followed rapidly with 10 ml. of water in which were dissolved 2.8 g. sodium nitrite. The mixture turned from a dark orange to a dark purple and finally a blood red color after the addition of the HCl-sodium nitrite solution. The reaction mixture was stirred for an additional 2 hours. The solid was removed by filtration and recrystallized from ethanol and isopropyl ether. The purified compound exhibited a melting point 157–58° C. and appeared as a yellow powder.

The embodiments of the invention in which an exclusive property or privilege is claimed are defined as follows:

1. A 4-N-nitroso-N-lower alkylaminobenzylidene derivative of a fused bicyclic moiety selected from the group consisting of 2-methyl quinoline, 4-methyl quinoline, and 1-methyl isoquinoline.

2. A compound according to claim 1 wherein N-lower alkyl is $C_1$–$C_4$ lower alkyl.

3. A compound according to claim 1 wherein the fused bicyclic moiety is 4-methyl quinoline.

4. A compound according to claim 1 wherein lower alkyl is methyl.

5. 4-(4-N-ethyl-N-nitrosoaminostyryl)quinoline.

6. 4-(4-N-methyl-N-nitrosoaminostyryl)quinoline

References Cited

Bahner et al., J. Med. Chem., vol. 11, pp. 401–2 (March 1968).

JOHN D. RANDOLPH, Primary Examiner

U.S. Cl. X.R.

260—576; 424—258, 330